Aug. 15, 1950  E. M. CALLENDER  2,519,109
TEMPERATURE CONTROL OF POWER FOR HEATED ENCLOSURES
Filed Aug. 22, 1946  2 Sheets-Sheet 2
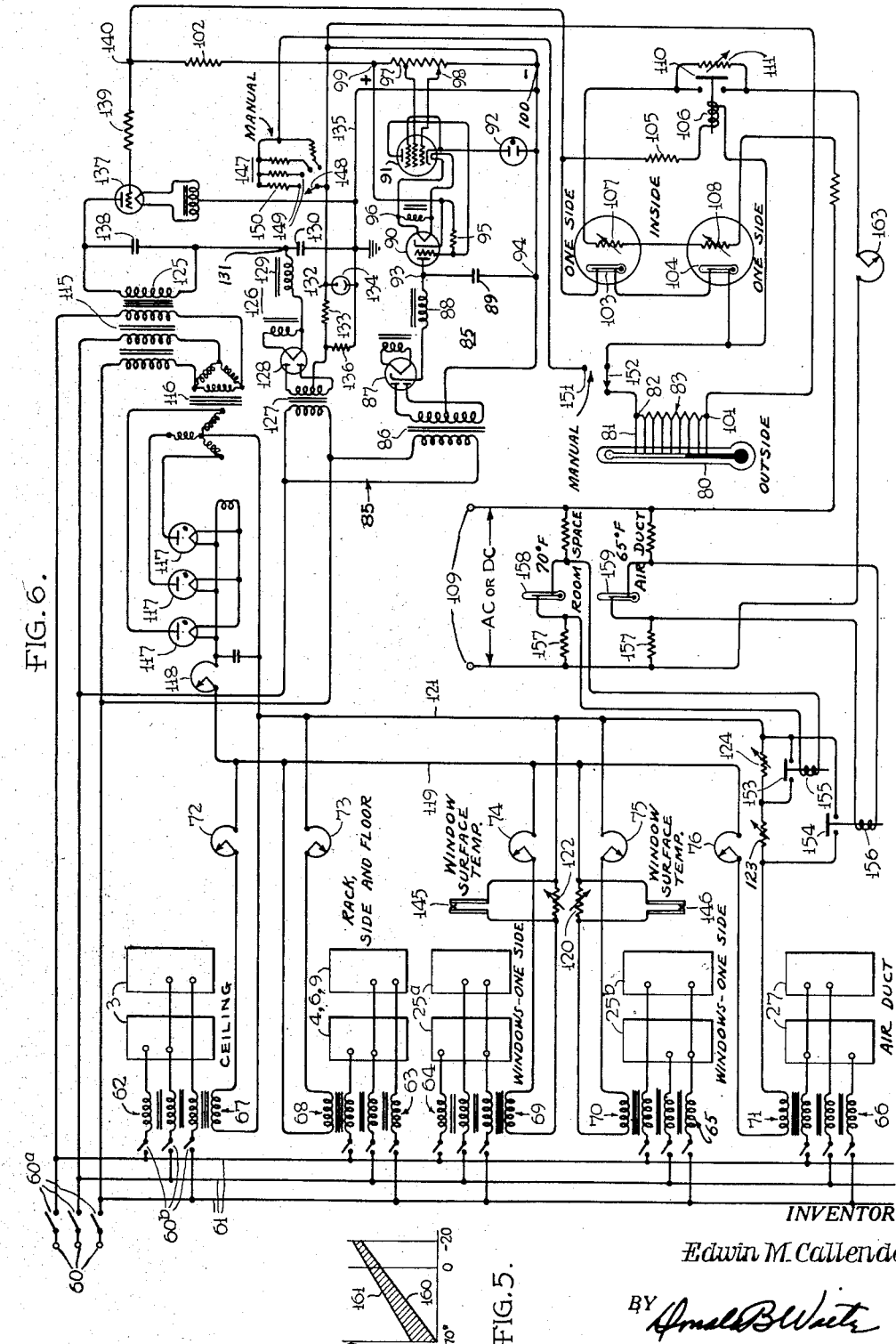
FIG. 6.
FIG. 5.
INVENTOR
Edwin M. Callender,
BY 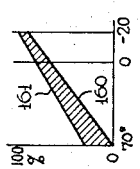
ATTORNEY Patented Aug. 15, 1950

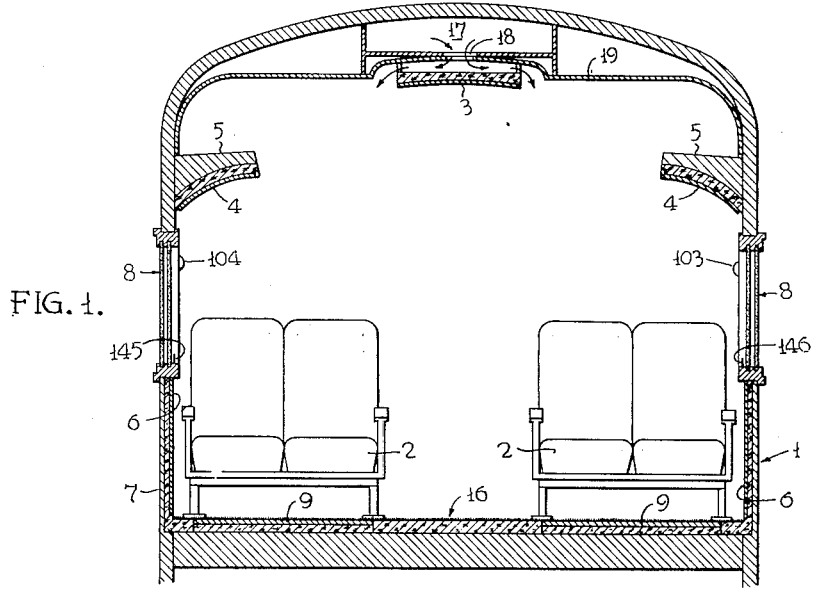

2,519,109

UNITED STATES PATENT OFFICE 2,519,109

TEMPERATURE CONTROL OF POWER FOR HEATED ENCLOSURES

Edwin M. Callender, Cynwyd, Pa., assignor to The Budd Company, Philadelphia, Pa., a corporation of Pennsylvania Application August 22, 1946, Serial No. 692,332

3 Claims. (Cl. 236—91)

This invention relates to enclosure heating systems, with particular application to the heating of passenger railway cars and other passenger vehicles. More specifically, the invention pertains to the control of power by temperature-sensitive means.

As described in the copending application of John E. Burton, Serial No. 687,132, filed July 30, 1946, now abandoned, enclosures may be heated adequately which employ radiant heat primarily, with supplementary convection heat derived from heated air flow. Effective control of this heat supply is necessary to secure a condition of comfort for the occupants of the enclosure. Such a control should be sensitive not only to temperature variations external to the enclosure, but also to such variations in temperature as may occur within the enclosure. Further, the inside control elements must properly be sensitive to temperature conditions at spaced points, such, for example, as at either side of a railway car.

Accordingly, a primary object of the invention is to provide a heat control for heating enclosures, or other power uses, which is sensitive to both external and internal temperature variations.

Additionally, an object is to secure proper heat control for enclosures which is subject not only to external temperature and internal radiation and temperature variations, but which is subject simultaneously to these variations.

Other objects of the invention include the provision of control means directly sensitive to temperature and radiation variations at different points within the enclosure; the provision of sensitive means in conjunction with power control of heat; the provision of a series of radiant heat-sensitive means to effect a cumulative control force on the power unit of the heat control; the provision of control means dependent directly on temperature conditions at the windows of the enclosure; the provision of a combination of heat-sensitive elements and associated circuit means which functions to control heat variation in an enclosure in accordance with variation of both radiant and convection heat; the provision of a heat control system utilizing saturable reactors efficiently; the provision of a control system in which the extent of power modulation varies inversely as the change of temperature; the provision of means in a control system for effecting at will either an inverse change of extent of modulation of power with downward change of outside temperature or a constant change of modulation in accordance with variation of outside temperature; and in general the employment of a sensitive, practical control for heat effective to produce a proper degree of comfort for occupants of an enclosure.

Stated generally, the objects of the invention are in part attained by employing a temperature-sensitive device external to the enclosure which is directly and linearly sensitive to temperature change and making this change effective on a current device so as to secure a uniform variation in the heat input of the enclosure unless modulated by temperature variation within the enclosure.

In the drawings:

Figure 1 is a diagrammatic sectional view of a railway car, showing the same provided with radiant heat panels at various locations throughout the car, and with windows, the panes of the windows and the radiant heat panels being heated in accordance with the present invention;

Figure 2 is an enlarged sectional view through a radiant heat ceiling panel;

Figure 3 is a plan view of a heating element for a radiant heat panel, which element is in the form of a resistance heating wire interwoven with suitable fabric;

Figure 4 is an enlarged sectional view through a typical heated window;

Figure 5 is a view showing the variation of power supply with outside temperature;

Figure 6 is a wiring diagram of the control circuit and the control elements therefor which may be used in the practice of the present invention; and Figure 7 is a view showing control factor variation through the circuit.

Referring to the accompanying drawings in which like numerals refer to like parts throughout the several views, there is diagrammatically shown in Figure 1, for the purpose of illustration, a conventional railway passenger car 1 having seats 2, and provided with a plurality of radiant heat sources for directing radiant heat rays for impingement upon the passengers, the seats, and other portions of the interior of the car. As here shown, there are radiant heat panels 3 supported from the ceiling for the full length or any desired portion of the length thereof, panels 4 supported at the undersides of the baggage racks 5, panels 6 supported from the vehicle side walls 7 between the seats 2 and below the windows 8, and panels 9 supported on the floor 10 between the seats. If desirable, the floor panels 9 and side wall panels may extend the full length of the vehicle.

The present invention is not concerned with the particular construction of or the manner of heating the radiant heat panels. However, electrically heated ceiling panels are shown in Figure 2, for the purpose of illustration, as comprising a metallic radiating sheet 11 having a suitable emissive surface facing the interior of the vehicle, which sheet is heated by a contacting blanket 12, such as a fabric having interwoven resistance heating wires 13 diagrammatically shown in Figure 3, and backed up by layers 14 of asbestos material and another backing 15 of cork for concentrating the heat on the surface of the radiating sheet 11 which faces the interior of the car. The floor panels are shown as covered by a floor covering 16. The radiant heat panels, however, may be of any other construction which will provide the desired amount of radiant heat.

As here shown, the vehicle has a ceiling duct 17 for discharging heated fresh and recirculated air through openings 18 into the vehicle, and the radiant heat panel or panels for the ceiling are supported immediately below these openings from a wall portion 19 of the ceiling in spaced relation thereto to provide a space 20 for the distrbution of the air into the vehicle. The ceiling panels, however, may be supported in different manners.

In a typical installation, the temperature of the incoming fresh and recirculated air is so controlled through temperature-responsive devices as to maintain an air temperature within the vehicle of between 60° F. and 65° F. which permits of a more satisfactory humidity condition, and the respective radiant heat panels (e. g., 3, 4, 6 and 9) are maintained through suitable control mechanism at such relative temperatures, depending upon the distances of the same from the seated passengers, that the radiant heat rays will provide the necessary radiant heat exchange for the desired uniform body warmth.

The windows 8 adjacent the passenger locations are heated to such degree approximating the body surface temperature that the loss of body warmth through radiation to the cold window surfaces is reduced to a very substantial degree. The passengers will thereby receive substantially the full warming effect and benefit of the radiant heat rays without being conscious of a direct heat loss to the windows, as is now customary. Figure 4 illustrates one form of window heating which may be utilized. In this form the window is comprised of inner and outer spaced panes 21 and 22, respectively, of glass or other transparent material mounted in insulation 23 carried by the window frame 24. In order to heat the window, the innermost pane 21 is provided with a resistance heating element which, as illustrated, is in the form of a thin transparent metal film 25 on the surface which faces the outer pane 22. Opposite ends of the film 25 are provided with buses 26 extending continuously for the full height or width of the area to be heated and from which the current-conducting leads 52 and 53 extend. Other heating means, such as, for example, very thin wires supported between laminations of glass or other material, may be utilized. A transparent film, however, will provide for uniform heating of the pane substantially throughout its entire area. The heated window here shown is somewhat similar to that shown and described in a copending application of John E. Burton, Serial No. 683,571, filed July 13, 1946, now Patent 2,513,993, issued July 4, 1950.

A circuit which may be used effectively for controlling the supply of power to the heating panels and heating units hereinabove described or to other types of loads is shown diagrammatically in Figure 6. In this Figure power is obtained from a three-phase alternating current source 60 provided with appropriate taps, as 61, and main switches may be placed at points such as 60a. The various panels and windows are indicated by the numerals 3, 4, 6, 9, 25a, and 25b, and air duct heaters by the numeral 27, and these panels, windows and duct heaters are directly connected to the power line 61 through saturable reactors, indicated by the numerals 62, 63, 64, 65 and 66.

Inasmuch as the ceiling panels 3 are heated to higher temperatures than the baggage rack, side and floor panels 4, 6 and 9, respectively, it is desirable to ultilize a separate saturable reactor, as indicated in the diagram. It is also desirable to heat the windows at one side of the car independently of those at the other side by reason of the fact that the outside temperature and prevailing winds at one car side may be such that a greater amount of heat may be needed to heat the windows at that side to the desired degree while the windows at the other side may require a lesser amount of heat. Accordingly, separate saturable reactors 64 and 65 are used for the window heaitng elements 25a and 25b, 25a representing the heating elements for the windows at one car side and 25b representing the heating elements for the windows at the other car side. Such adjustment of the heating current in these window controls as may be desired is made by manual resistors, as will be pointed out hereinafter. Appropriate manual switches may be placed in series with these reactors at points such as 60b to make or break the circuit. Associated with each of the reactors is a direct current coil, designated for each unit by the numerals 67, 68, 69, 70 and 71, whereby the degree of saturation may be progressively modified to determine the amount of power supplied the various panels. The control of these various direct current coils may be either manual, as by the various resistors 72, 73, 74, 75 and 76, or by automatic means subject to temperature conditions which will now be described, the manual control providing for special conditions at a given panel, as excess heat for the ceiling panel and greater heat for the windows on one side of the car than on the other.

Exterior to the railway car or other enclosure to be heated is positioned a heat-sensitive device, such as the thermometer 80. This thermometer is constructed so that by movement of the mercury column within the tube, electrical resistance of a circuit is modified. This may be accomplished by placing a conducting film within the tube with appropriate electrical connections so that movement of the mercury modifies the resistance of the film, or, as indicated in the drawing, a series of taps 81 may be inserted in the wall of the thermometer with the internal terminal thereof adapted for short-circuiting by the mercury column, and the external terminals connecting sections 82 of a resistor coil 83 so that the short-circuiting action of the mercury column will cut in or cut out the sections of the resistor and thus modify substantially linearly the total resistance of the resistor 83. As shown, the higher the temperature the less the resistance, and for the full range of the thermometer, which for practical purposes may be within the limits of −20° F. and 70° F., the value of the resistance may amount to approximately 100,000 ohms.

The current supplied to the thermometer 80 is preferably direct current, and this is secured from rectifying means, generally indicated by the numeral 85. Rectification is conventional in that it is obtained directly from the source 60 through transmission by means of a transformer 86, a full-wave rectifier tube 87, and adjunct connections to the cathode of the rectifier and the mid-point of the secondary of the transformer, through ripple-eliminating filter elements including the choke coil 88 and capacitor 89. This direct current is then passed through electronic means to secure a constant voltage on the transmitted current with effective control means for variation of the voltage within limits. This electronic means includes an amplifying vacuum tube 90, a pentode vacuum tube 91, and a constant voltage tube 92 connected in series between the positive point 93 and negative point 94 of the rectified circuit. A resistor 95 is interposed between the cathode of tube 90 and the anode of tube 91, the grid of tube 90 being connected to the conductor between the resistor 95 and the tube 91. The cathodes of tubes 90 and 91 are heated by supply from filament transformers 86, 96. Control of the current of pentode tube 91 is obtained through connection of the control and screen grids across a resistor 97, which resistor is connected across the pentode 91 and the constant potential tube 92. The contact 98 at the resistor 97 of the control grid of tube 91 is movable so as to vary the bias on the grid, and accordingly the current flow through the tube and through the adjoining circuit.

There is thus provided for the rectifying constant potential circuit 85 a positive output terminal 99 and a negative output terminal 100. The negative terminal is connected directly to the low-temperature terminal 101 of the outside thermometer 80. The positive terminal 99 is connected through a resistor 102 to the high-temperature terminal 82 of the thermometer 80 through a series parallel circuit, one branch including two thermometers 103 and 104 in series and the other branch including a resistor 105 and a sensitive relay coil 106 connected in series. The particular function of the thermometers 103 and 104, which are diagrammatically indicated and which may be any type of thermosensitive element, is to superimpose on the control of the outside thermometer 80 a secondary control based upon the temperature of the interior of the enclosure. For this purpose these inside thermometers are placed at points found advantageous to correctly indicate the temperature condition of the interior, as on opposite sides and ends of the car. Preferably, also, these thermometers should be constructed with accessory elements making them particularly sensitive to heat by radiation from the panels as distinguished from convection heat arising from the movement of the atmosphere adjoining the thermometers. Both thermometers are identical in construction in that each contains a mercury column and taps embedded in the insulating holder contacting with the column, so that, at certain predetermined points, with a falling column an electric circuit will be opened, and on a rising column a previously open electric circuit will be closed. These inside thermometers are each combined in a unit including the thermometer and a heating resistor, the resistors for the units being numbered 107 and 108 and being variable in order to modify the heat supply thereof as transmitted to the thermometers. The effect of these resistors is to maintain each thermometer at a temperature of approximately 80° F., in order to simulate human body surface temperature. By arranging these thermostats in series and at opposite sides of the car, should the radiant temperature at one car side or other drop, the particular thermostat at that side will function to cause additional heat to the panels to be provided.

The heating current for the resistors 107 and 108 is supplied from any appropriate fixed source, either alternating current or direct current, as indicated by the numeral 109, there being employed a relay switch 110 operated by relay coil 106 in conjunction with a variable resistor 111 to step up the current supply in anticipation of a temperature change. The desirability of anticipating a change in temperature occurring at selected points in the enclosure, such as may be indicated by special thermometers, arises from the time lag which necessarily occurs between the point when a change occurs at the heat source and the time when it is effective in the heat-sensitive means within the enclosure, such as the thermometers 103 and 104. In operation this time lag anticipation device operates to supply excess heat to the resistors 107 and 108 as soon as either thermometer 103 or 104 breaks circuit. When this occurs the sensitive relay 106 short-circuits the resistor 111 by closing contact switch 110, thereby supplying more current to the resistors 107 and 108 and accelerating the movement of the mercury column of each thermometer to the point of electrical contact. Anticipation is thus obtained providing much closer differentials of comfort conditions than may be otherwise possible.

It thus appears that the output points of the direct current constant potential circuit 99 and 100 supply current through a circuit including the inside thermometers 103 and 104, as well as the relay 106 and series-connected resistor 105, and that accordingly the value of the current flowing in this connected circuit will be dependent directly on the position of the mercury column in the external thermometer 80 by virtue of the connected resistor 83, provided the electrical connections on the inside thermometers 103 and 104 are maintained. As soon as the latter thermometers cut out, however, for any given fixed position of the external thermometer 80, the current values will be modified accordingly. Consequently, use is made of this circuit, including the inside and outside thermometers, for regulating the flow of current in a power control circuit, which will now be described.

Directly connected to the current source conductors 60 is a saturable reactor, indicated by the numeral 115, this reactor having conductive coils leading to the phase line transformer 116. Each secondary outlet terminal of this transformer is connected to a rectifier tube, indicated by the numeral 117, which passes rectified current through a rheostat 118 to main conductor 119 where connection is made to the various variable resistors 72, 74 and 76 and the corresponding controlling coils 67, 69 and 71 of the various reactors 62, 64 and 66. The conductor 119 is also connected directly to control coil 68 of reactor 63 and to control coil 70 of reactor 65 through a variable resistor 120. The return point of the phase line transformer is connected by conductor 121 directly to the control coil 67 of saturable reactor 62 and through the resistor 73 to control coil 68 of reactor 63, through the variable resistor 122 to the control coil 69 of reactor 64, through resistor 75 to the control coil 70 of reactor 65, and through variable resistors 123 and 124 to the control coil 71 of reactor 66. Accordingly, variation of the direct current supplied through the rectifiers to conductors 119 and 121 from the current source determines the saturation of the various reactors and hence the amount of current supplied the panels for heating purposes.

The control reactor 115 connected to the line transformer 116 determines the amount of direct current supplied the controlling coils of the load reactors, and the means by which the degree of saturation of the reactor 115 is changed will now be described. A separate rectified circuit is employed for the control coil 125 associated with the reactor 115, as indicated by the numeral 126. This rectifying circuit includes the transformer 127 connected to lines 60, the full-wave rectifying tube 128, and the filtering coil and capacitor 129 and 130 leading to direct current terminals 131 and 132. A resistor 133 is interposed between the point 132 and the mid-point of the rectifying transformer. A constant voltage tube 134 is connected between point 132 and the conductor 135 joining the mid-point of the rectifying transformer through resistor 136 and the cathode of an amplifying tube 137. The anode of this tube has direct connection to one terminal of the control coil 125 of the saturable reactor 115. The other terminal of this control coil is connected to the positive point 131 of the rectified supply. A capacitor 138 is connected in parallel across the control coil 125.

It now appears that the current through the control coil 125 is a direct current of constant voltage whose magnitude is subject to the bias of the grid of tube 137. This grid is connected through a resistor 139 to the circuit of the outside thermometer 80 at point 140 intermediate the resistor 102 and the junction point of the parallel circuits, including the relay coil 106 and series resistor 105 in the one branch, and the series thermometers 103 and 104 in the other branch. This point 140 is variable in potential directly with the position of the mercury column in the outside thermometer 80. The potential of this point also varies with the temperature effective on the inside thermometers 103 and 104 so that there is provided a linearly variable bias on the grid of tube 137 such as will modify the current flow through tube 137 and thereby control the degree of saturation of the reactor 115. It is pointed out that the characteristics of the reactor 115 are so selected as to secure a linear variation of voltage of the reactor 115 with variations in current as supplied from the direct current amplifying circuit including tube 137.

The elements of the circuit hereinabove described include many of the essential features. Certain additional auxiliary controls may also be advantageously used. Reference is made to the auxiliary control means employed for the window heating elements 25a and 25b where variable resistors 120 and 122 are shown in circuit with the control coil of the load reactors 64 and 65. In parallel with these resistors are auxiliary thermo-contact devices or thermostats, diagrammatically indicated by numerals 145 and 146, which are so located as to be responsive to the temperature of the inside surfaces of the windows. Each control circuit for the window heating elements employs a single thermostat 145 or 146, as the case may be, which is responsive to the temperature of one window only at the one car side. These thermostats are intended to open a short-circuiting path about the connected resistors at a given predetermined temperature, so that on the development of excessive temperature at the point of placement of the thermostats the contacts open, making the connected resistor effective in the circuit to diminish the current flow therein and thus decrease the heat in the window panel. With a drop in temperature the thermostats close, short-circuiting the resistors and supplying more current to the reactor unit or limitor. It is pointed out that the percentage change of current and hence the percentage change of heat produced by the insertion and removal of the resistors 122 and 120 is substantially the same for any set value of the total current flowing in the control circuit including these resistors.

Another supplementary control unit of the circuit appears in the provision of manual means to control the panel heating in the event that the automatic control by the outside thermostat 80 is not desired. This manual control is indicated generally by the numeral 147 and includes a switch 148 having a movable contact adapted to engage a plurality of fixed contacts 149. To these fixed contacts are connected resistors 150 which in turn are connected to a terminal 151 forming a contact for engagement of the switch arm 152, whereby connection is made to the positive terminal 99 of the rectifier circuit 85 and the thermostat 80 is cut out. The movable arm of switch 148 is connected to the point 100 of the circuit 85. Accordingly, with the manual control connection established, it is now possible by movement of the arm switch 148 to modify the resistance manually in the output from points 99 and 100 of circuit 85, whereby appropriate bias is placed on the grid of tube 137 and modification of the current in the panel loads is brought about.

A further modification of the control is shown in connection with the air duct heating load 27. The circuit diagram illustrates this load as being associated with the reactor 66 under control of the direct current coil 71 and manual resistor 76. Additional resistors 123 and 124 have been mentioned as included in the circuit of the coil 71. These resistors are provided with short-circuiting conductors in which contact switches 153 and 154 are operated by relay coils 155 and 156. These coils have connection to a source of power such as 109, preferably through resistors 157 on either side of the relay coils to limit the current. In shunt with the relay coils are circuits each including a heat-sensitive device or thermostat, such as a thermometer, which functions to maintain a short circuit about the relay under ordinary temperature conditions, but on a drop below a predetermined value of temperature will open the short circuit for the corresponding relay coil and thus make the relay coil operative to close the short-circuiting contacts about the resistors 123 and 124. In the case of relay coil 155 the thermometer 158 is indicated, and for relay coil 156 thermometer 159. The operating temperature of thermometer 158 may be set at 70° F., for example, and thermometer 159 at 65° F. These thermometers may be placed at different points within the interior, the thermometer 158 being placed in the open interior space, whereas the thermometer 159 may be placed in the air duct so as to be directly affected by the flow of air prior to entrance into the enclosure. It is pointed out that the control of this relay thermometer unit is by uniform percentage change for different values of current. Also, the effect of each thermometer is additive, below 65° F. both resistors being cut in.

In the circuit as hereinabove described filament current for the various tubes, as the rectifying and amplifying tubes, is supplied by filament transformers, tube 87 by transformer 86, tubes 90 and 91 by transformer 86, tube 128 by transformer 127, and tube 137 by transformer 86.

In summarizing the physical characteristics of the circuit, it may be stated that there is shown a load, such as a heating panel, which is connected to an alternating current source through a current control element, such as a saturable reactor, with associated direct current control means. The control means is in turn connected jointly to two sets of thermometers, one being outside the enclosure and the others being within the enclosure at spaced points. The temperature variation of the external thermometer produces a variation in the current conditions therein which may be linear, as is indicated by curve 180 of Figure 7, and which is made effective on a controlling saturable reactor 115 to vary the voltage thereof directly in accordance with the variation of the thermometer reading, as indicated by curve 181 of Figure 7.

The linear voltage change of reactor 115 is imposed on control coils 67, 68, 69, 70 and 71 of the power reactors 62, 63, 64, 65 and 66. In order to secure a linear variation in the load output, as illustrated by curve 182 of Figure 7, the characteristics of the control coils are so chosen as to secure a voltage output with current excitation as supplied from reactor 115, which reflects the power or square of the voltage, as shown by curve 183 of Figure 7. The imposition of this variable voltage square control on the power reactors 62-66 transmits a straightline variation of load or heat output, which is the result desired. Reference is made to Figure 7 as illustrating the control action for a middle temperature point X, indicated by line 184. For the given temperature the current value of the linearly variable thermometer is imposed as a middle linear function on the control reactor 115 as a value approximating 70% on the voltage square curve 183 of the reactor control coil and as a 50% energy output value on the linear curve 182 from the power reactors.

Obviously there may be conditions of control which would require a non-linear output of load, in which case the characteristics of the control reactor 115 or the power control D. C. coils could be modified. Alternatively, the characteristics of the control reactor 115 could be modified to give a gradient with a decreasing rate of voltage increase with current excitation, thus reflecting a linear characteristic in the power reactor control coils and a linear variation in the load output.

The external thermometer 80 affords further means of control variation in that while the resistor sections 82 are indicated as of uniform resistance, the resistance may be made non-uniform in order, for example, to increase relatively the load output at lower temperatures.

The control is modulated by means of the internally placed thermometers so that there is a basic linear change in the load supply on which is superimposed a modulation change. It is noted, further, that the magnitude of the modulation change varies with the temperature, the percentage of change at high temperatures being greater and that of low temperatures being lesser. This is a desirable characteristic, as physiologically relatively high percentage changes at low temperature are undesirable. This characteristic is brought out in Figure 5 of the drawing in which ordinates are indicated as power and the abscissae as outside temperature. The lower line indicated by the numeral 160 indicates the linear power change. The shaded area above the line 160, bounded by upper line 161, indicates the modulation achieved at different temperatures, the extent of change diminishing with decrease in temperature, as previously pointed out. In this connection it is further observed that there may be used jointly with the modulated linear control a uniform temperature variation secured by means of the relay thermostat device of the window panels or the relay-thermometer control of the air duct panel. The addition of the uniform percentage control means will, of course, modify the nature of the modulation zone, as shown in Figure 5.

A short description of the operation of the heating system may be desirable. For such a description it may be assumed that the temperature conditions within the enclosure are such as to secure closure of the internal thermometers 103, 104, 158 and 159, as well as closure of the thermostats 145 and 146. Under these conditions power is being supplied the heating devices through the various saturable reactors 62, 63, 64, 65 and 66. A set degree of saturation in the reactors according to the temperature conditions is effective, which may be fixed for a given time. If it now be assumed that the temperature external to the enclosure rises in value, the resistance of resistor 83 is diminished, and consequently, with no change in the interior temperatures effective on the thermometers 103 and 104, the IR drop from the positive point 99 of the constant voltage circuit 85 through the resistor 102 increases, increasing the bias on the grid of tube 137 and diminishing the flow of current in the secondary 125 of reactor 115. It follows, therefore, that the amount of direct current in the control coils of the load reactors is thereby diminished and the amount of current in the load panels is consequently reduced. On the other hand, if the temperature external to the enclosure be decreased and the level of the column in the thermometer 80 falls, the resulting increased resistance would reduce the current flow in the circuit, including the resistors 102 and 105 and the relay coil 106, thereby decreasing the bias on the grid of tube 137. This would reverse the effect on the load reactors to increase the flow of current linearly in the heating panel. This control is facilitated by the high gain of the load reactors, three watts controlling as much as 450 watts of power.

Should a given setting of the external thermometer column level be accompanied by a reduction of the temperature within the enclosure to the point where the circuit is broken by either thermometer 103 or 104, this would be accompanied immediately by an increase in voltage across the resistor 105 and immediate actuation of the sensitive relay 106 resulting in closure of relay contact switch 110. The effect of this switch closure is to short-circuit the resistor 111 included in the heating circuit for the interior thermometers 103 and 104, thus increasing the flow of current in these heating resistors and hastening the movement of thermometers 103 and 104 to the position of closure. In this manner the change in source heat of the panel, as brought about by the exterior thermometer 80 or following a temperature reduction within the enclosure, is anticipated in the interior control unit including the thermometers 103 and 104 and conditions of comfort thereby achieved with less fluctuation than would be otherwise the case.

The thermostats 145 and 146 are placed adjacent the windows, as indicated in Figure 1, so as to be responsive to the temperature of that window surface which faces the interior of the car, and, as previously stated, will open the short-circuit about the resistors 122 and 120 if the temperature of the window surfaces which face the interior of the car exceeds a predetermined value. Also, the specific heat-sensitive control of the air modulation achieved through the use of auxiliary thermometers 158 and 159 may become effective depending upon temperature conditions within the enclosure or within the air duct leading into the enclosure.

It is pointed out that the operation secures for the heat control a variation substantially directly in accord with temperature changes external to the enclosure, and that this direct or linear variation is made possible by the use of saturable reactors in conjunction with an external thermometer having resistor elements changeable in magnitude in approximately linear fashion with temperature changes. It is further pointed out that through the electronic means employed a highly flexible control of the fixed values of the circuit is made possible. For example, in the constant voltage circuit the tube 92 serves as a reference voltage of fixed value additive to the voltages as obtained from the rectifier and as controlled by the slide 98 on the resistor 97. Attention is also directed to the series relationship of the auxiliary interior thermometers 103 and 104 operative to modulate the normal current value of the load circuit in accordance with temperature changes at spaced points within the enclosure, as, for example, at either end of a railway car. In use the room interior temperature is maintained relatively low as affording better conditions of comfort for the occupants. At the same time, the auxiliary interior thermometers 103 and 104 are set at a normal temperature of 80° F., simulating body temperature, and, effective at pronounced deviation from this set value, to modulate the main control.

The circuit as described has been found useful and effective for accomplishing the objects of the invention, but it is apparent that modifications adaptable to special uses may be made and hence no limitation is implied by the specific disclosure other than may be required by the scope of the appended claims.

What is claimed is:
1. A heating system for enclosures comprising in combination, a plurality of separate heating units within an enclosure, means for supplying heating power to said units, means responsive to outside temperatures for controlling the amount of power supplied to all of said units in accordance with outside temperatures, means responsive to inside temperatures for varying in fixed steps the supply of power to all of said units between higher and lower values within the limits determined by said outside temperature responsive means, and further means responsive to inside temperature for varying in fixed steps the supply of power to at least one and less than all of said units between higher and lower values within the limits determined by said outside temperature responsive means as limited by said first inside temperature responsive means.

2. A heating system for enclosures comprising in combination, means for supplying air to the enclosure, a heating unit for heating air passing to said enclosure, a heating unit for radiantly heating objects within said enclosure, means responsive to outside air temperature for controlling the amount of power supplied to all of said heating units in accordance with outside temperatures, means conjointly responsive to inside air temperatures and to radiant heat for varying in fixed steps the supply of power to at least one of said heating units between higher and lower valves within the limits determined by said outside temperature responsive means, and means responsive to temperatures adjacent at least one but less than all of said units for additionally varying in fixed steps the supply of power to said unit with which it is associated between higher and lower values within the limits determined by said outside temperature responsive means as limited by said first inside temperature responsive means.

3. A heating system for enclosures comprising in combination, means including a duct for supplying air to the enclosure, a heating unit for heating air passing through said duct, a heating unit for radiantly heating objects within said enclosure, means responsive to outside air temperatures for controlling the amount of power supplied to all of said heating units in accordance with outside temperatures, means conjointly responsive to inside air temperatures and to radiant heat within the enclosure for varying in fixed steps the supply of power to at least one of said heating units between higher and lower values within the limits determined by said outside temperature responsive means, means responsive to temperatures existing near a side of the enclosure for further varying in fixed steps the power supplied to the radiant heating unit between higher and lower values within the limits determined by said outside temperature responsive means as limited by said first inside temperature responsive means, and plural means responsive severally to air temperature inside said duct and inside the enclosure for varying by fixed steps the supply of power to said duct heating means between higher and lower values within the limits determined by said outside temperature responsive means as limited by said first inside temperature responsive means.

EDWIN M. CALLENDER.

REFERENCES CITED

The following references are of record in the file of this patent:

UNITED STATES PATENTS

| Number | Name | Date |
|---|---|---|
| 1,146,879 | Hynes | July 20, 1915 |
| 1,583,496 | Shafer | May 4, 1926 |
| 1,730,254 | Thomas | Oct. 1, 1929 |
| 1,771,273 | Smith | July 22, 1930 |
| 1,868,232 | Horton et al. | July 19, 1932 |
| 2,030,945 | Smith et al. | Feb. 18, 1936 |
| 2,079,466 | Phillips | May 4, 1937 |
| 2,080,797 | Wiegand | May 18, 1937 |
| 2,102,487 | Schwarz | Dec. 14, 1937 |
| 2,168,680 | Nordgren | Aug. 8, 1939 |

(Other references on following page)

UNITED STATES PATENTS

| Number | Name | Date |
|---|---|---|
| 2,205,164 | Chappell et al. | June 18, 1940 |
| 2,257,471 | McGrath | Sept. 30, 1941 |
| 2,269,566 | Van Daam | Jan. 13, 1942 |
| 2,272,492 | Weyher | Feb. 10, 1942 |
| 2,272,769 | Crago | Feb. 10, 1942 |
| 2,298,181 | Stranszky | Oct. 6, 1942 |
| 2,298,847 | Smith | Oct. 13, 1942 |
| 2,308,318 | Sparrow | Jan. 12, 1943 |
| 2,311,118 | Matthews et al. | Feb. 16, 1943 |
| 2,383,806 | Kubler et al. | Aug. 28, 1945 |

FOREIGN PATENTS

| Number | Country | Date |
|---|---|---|
| 389,216 | Great Britain | Mar. 16, 1933 |